US006697572B2

(12) United States Patent
Manabe et al.

(10) Patent No.: US 6,697,572 B2
(45) Date of Patent: Feb. 24, 2004

(54) CAMERA (75) Inventors: Mitsuo Manabe, Saitama (JP); Kenji Yamane, Saitama (JP)

(73) Assignee: Fujii Photo Optical Co., Ltd., Saitama (JP)

( * ) Notice: Subject to any disclaimer, the term of this patent is extended or adjusted under 35 U.S.C. 154(b) by 41 days.

(21) Appl. No.: 10/107,013

(22) Filed: Mar. 26, 2002

(65) Prior Publication Data

US 2002/0141749 A1 Oct. 3, 2002

(30) Foreign Application Priority Data

Mar. 29, 2001 (JP) ........................................ 2001-095693
Feb. 14, 2002 (JP) ........................................ 2002-037406

(51) Int. Cl.[7] ............................................... G03B 5/03
(52) U.S. Cl. ...................................................... 396/176
(58) Field of Search ......................................... 396/176

(56) References Cited

U.S. PATENT DOCUMENTS 5,708,867 A * 1/1998 Nagata et al. ................. 396/62
6,497,520 B2 * 12/2002 Omiya ....................... 396/62 X
2002/0071669 A1 * 6/2002 Omiya ......................... 396/175

* cited by examiner

*Primary Examiner*—W. B. Perkey
(74) *Attorney, Agent, or Firm*—Frommer Lawrence & Haug LLP; Matthew K. Ryan; Dennis M. Smid (57) ABSTRACT Provided is a camera capable of achieving a simplification of an assembly process thereof. The camera comprises a camera body, a gear system for driving a movable barrel of a zoom lens, and a flash tube for illuminating a subject. A flash holding plate holding the flash tube is mounted on the camera body. The flash holding plate is configured so as to hold not only the flash tube, but also each gear of the gear system by sandwiching the gear between the flash holding plate and the front face of the camera body. Thereby, the assembly process can become simpler, and the number of components can be reduced.

15 Claims, 4 Drawing Sheets

CAMERA

BACKGROUND OF THE INVENTION

1. Field of the Invention

The present invention relates to a camera, and more specifically, the invention relates to a camera comprising a gear system for driving a movable part such as a movable barrel of a zoom lens, and a flash tube.

2. Description of the Related Art

In general, a camera comprises a flash unit for irradiating a subject with light (a flash). The flash unit is a box-shaped flash case accommodating a flash tube made of a Xe (xenon) tube, and a reflector disposed around the flash tube. The flash case is mounted on the upper side of a camera body.

Incidentally, a gear system including a plurality of gears for driving a movable barrel of a zoom lens and so on is disposed on a front face of the camera body (that is, a face of the subject's side). The gears of the gear system are rotatably supported by a plurality of pins provided in a protruding condition on the front face of the camera body, respectively. Further, a gear holding plate which is a plate-shaped part is disposed so as to face the front face of the camera body. The gear holding plate holds each gear so as to prevent the gear from falling out of the pin.

Conventionally, in an assembly process of the camera, each gear of the gear system, the gear holding plate and the flash case are separately mounted on the camera body.

However, in the case where each gear of the gear system, the gear holding plate and the flash case are separately mounted on the camera body, it is difficult to achieve a simplification of the assembly process of the camera.

SUMMARY OF THE INVENTION

In light of the foregoing problem, it is an object of the present invention to provide a camera capable of achieving a simplification of an assembly process thereof.

A camera having a movable part according to the invention comprises: a camera body; a gear system including a plurality of gears for driving the movable part; a flash tube for irradiating a subject with light; and a holding member mounted on the camera body, and holding the flash tube and the plurality of gears of the gear system.

In a camera according to the invention, the flash tube, and each gear of the gear system are held by a holding member.

Further, in a camera according to the invention, it is preferable that the camera body includes a front face with a plurality of pins provided in a protruding condition, and supporting the plurality of gears to be rotatable, respectively, and the holding member is disposed so as to face the front face of the camera body, and holds the plurality of gears so as to prevent the plurality of gears from falling out of the plurality of pins. Moreover, it is preferable that the camera further comprises a circuit board mounting a circuit for driving the flash tube thereon, and the holding member includes an engagement portion engaged with the circuit board to hold the circuit board. In addition, it is preferable that the holding member further includes a shielding member covering one side of the flash tube. Moreover, the holding member preferably includes a box-shaped portion for accommodating the flash tube, and a plate-shaped portion for holding the gear system between the camera body and the holding member.

In a camera according to the invention, the movable part is preferably a movable barrel with built-in lenses.

Other and further objects, features and advantages of the invention will appear more fully from the following description.

DETAILED DESCRIPTION OF THE PREFERRED EMBODIMENTS

A preferred embodiment of the invention will be described in detail below referring to the accompanying drawings.

Figure 1:
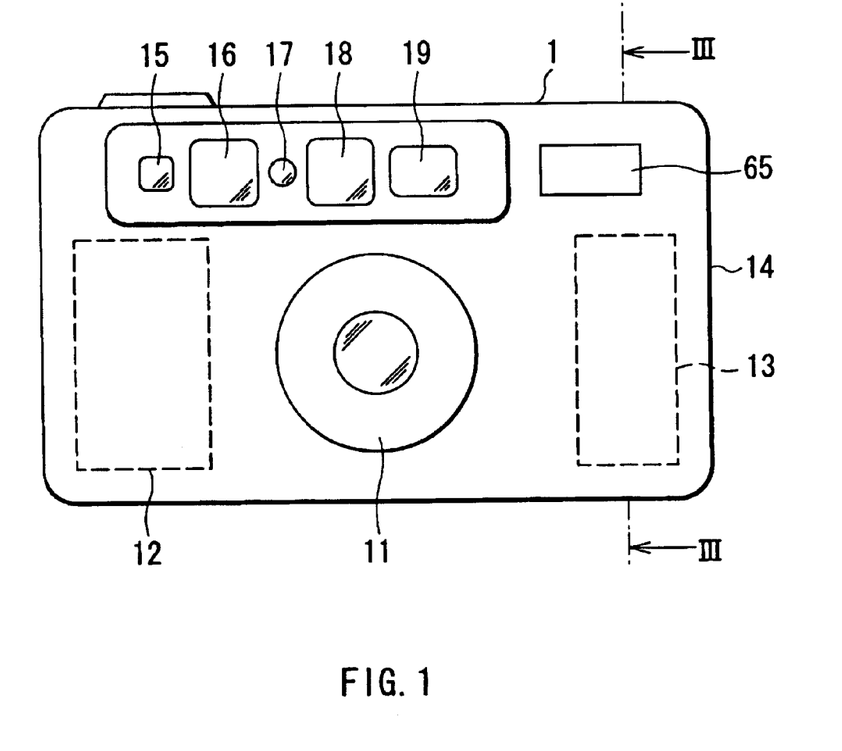
FIG. 1 is a front view showing an appearance of a camera according to an embodiment of the invention.

FIG. 1 shows a front view (that is, a view from the side of a subject) of a camera 1 according to the embodiment of the invention. In the following description, the side of the subject is considered as "front", and the side of a photographer is considered as "rear". The camera 1 is a so-called compact camera, and comprises a casing 14 of a rectangular shape. A zoom lens portion 11 having a picture-taking lens is disposed in a substantially central portion of the camera 1 when viewed from the front. In the camera 1, a film chamber 12, where a film cartridge (not shown) is loaded, and a take-up chamber 13, where a film transported from the film cartridge is taken up, are disposed on the both sides of the zoom lens portion 11. Further, the camera 1 has a longer length in a film-transporting direction (that is, in a lateral direction in FIG. 1).

In the camera 1, on the upper side of the zoom lens portion 11, a photo-sensing portion for photometry 15, a light-emitting portion for range-finding 16, a red-eye minimizing lamp 17, a finder portion 18 and a photo-sensing portion for range-finding 19 are provided. The light-emitting portion for range-finding 16 and the photo-sensing portion for range-finding 19 are provided for measuring a lens-to-subject distance. Also, a window portion for flash light 65 is disposed adjacent to the photo-sensing portion for range-finding 19.

Figure 2:
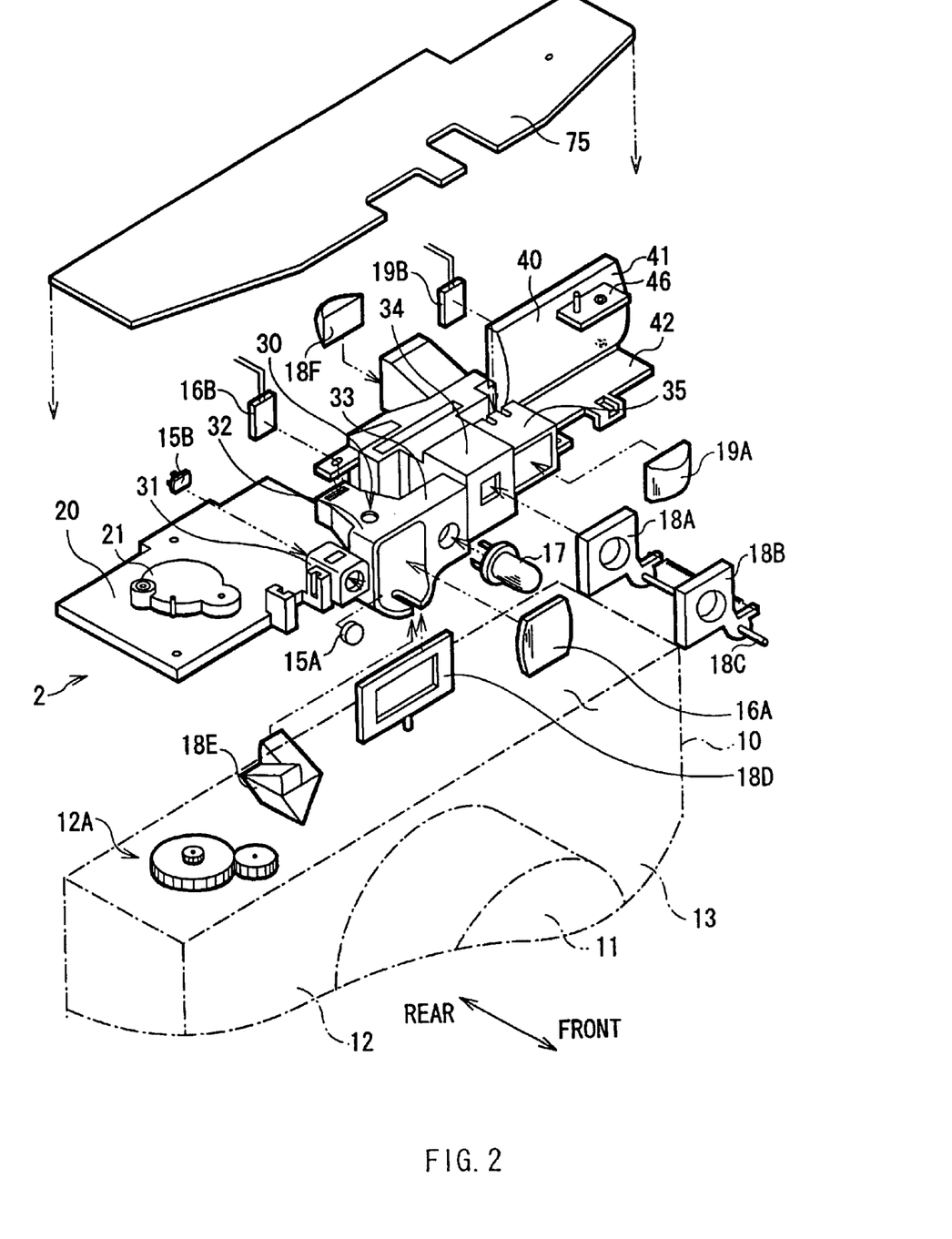
FIG. 2 is an exploded perspective view showing a configuration of the camera shown in FIG. 1.

FIG. 2 shows an exploded perspective view of an internal configuration of the camera 1 shown in FIG. 1. The camera 1 comprises a camera body 10 covered with the casing 14 (refer to FIG. 1). The camera body 10 includes the lens portion 11, the film chamber 12 and the take-up chamber 13 described above. On the upper side of the camera body 10, a holding member 2 is mounted. The holding member 2 is integrally molded of plastic, and has a longer length in a direction along the direction of the length of the camera 1.

The holding member 2 includes a plate portion 20, a block portion 30 and a semicylindrical portion 40 aligned along the direction of the length. The plate portion 20, the block portion 30 and the semicylindrical portion 40 are disposed on the upper sides of the film chamber 12, the zoom lens portion 11 and the take-up chamber 13, respectively, in a state that the holding member 2 is mounted on the camera body 10. The plate portion 20 is provided for holding a gear train 12A disposed on the upper side of the film chamber 12 of the camera body 10. The block portion 30 is provided for holding the respective components of the photo-sensing portion for photometry 15, the light-emitting portion for range-finding 16, the red-eye minimizing lamp 17, the finder portion 18 and the photo-sensing portion for range-finding 19 shown in FIG. 1. The semicylindrical portion 40 is provided for holding a battery.

The plate portion 20 has a projected portion 21 which is projected upward to a predetermined degree. A recessed portion is formed on the bottom side of the projected portion 21 (that is, on the side of the camera body 10), and the gear train 12A of the camera body 10 is accommodated in the recessed portion. The gear train 12A is provided for turning a spool of the film cartridge (not shown) accommodated in the film chamber 12 of the camera body 10.

The block portion 30 has a first mounted part 31, a second mounted part 32, a third mounted part 33, a fourth mounted part 34 and a fifth mounted part 35 in order from the side of the plate portion 20.

The first mounted part 31 is a substantially-prismatic-shaped part having an opening in the front thereof. A lens for photometry 15A is mounted in an opening portion of the first mounted portion 31, and a photo-sensing device for photometry 15B is mounted in the interior of the first mounted portion 31. The lens for photometry 15A and the photo-sensing device for photometry 15B constitute the photo-sensing portion for photometry 15 (refer to FIG. 1).

The second mounted portion 32 is a substantially-tubular-shaped part having an opening in the front thereof. A projection lens 16A is mounted in an opening portion of the second mounted part 32, and a light-emitting device 16B which emits infrared radiations is mounted in the interior of the second mounted part 32. The projection lens 16A and the light-emitting device 16B constitute the above-mentioned light-emitting portion for range-finding 16 (refer to FIG. 1).

The third mounted part 33 is a substantially-prismatic-shaped part having an opening in the front thereof. The red-eye minimizing lamp 17 made of a light-emitting diode (LED) is mounted in an opening portion of the third mounted part 33.

The fourth mounted part 34 is a substantially-prismatic-shaped hollow container having a window portion in the front thereof. A pair of movable lenses 18A and 18B, and a guide bar 18C for guiding fore-and-aft motions of the movable lenses 18A and 18B are accommodated in the fourth mounted part 34. On the rear side of the fourth mounted part 34, a view frame 18D, a prism 18E and an eyepiece lens 18F are mounted. The movable lenses 18A and 18B, the view frame 18D, the prism 18E and the eyepiece lens 18F constitute the finder portion 18 (refer to FIG. 1). The movable lenses 18A and 18B move in synchronization with a movable barrel 112 (refer to FIG. 4) which will be described later in the zoom lens portion 11, so an image of the subject scaled corresponding to a shooting magnification specified by a position where the movable barrel 112 is moved can be viewed through the eyepiece lens 18F.

The fifth mounted part 35 is a substantially-prismatic-shaped part having an opening in the front thereof. A lens for photo-sensing 19A is mounted in an opening portion of the fifth mounted part 35, and a photo-sensing device 19B made of a photo diode is mounted in the interior of the fifth mounted part 35. The lens for photo-sensing 19A and the photo-sensing device 19B constitute the photo-sensing portion for range-finding 19 (refer to FIG. 1) to sense the reflection of light emitted from the above-mentioned light-emitting portion for range-finding 16.

Figure 3:
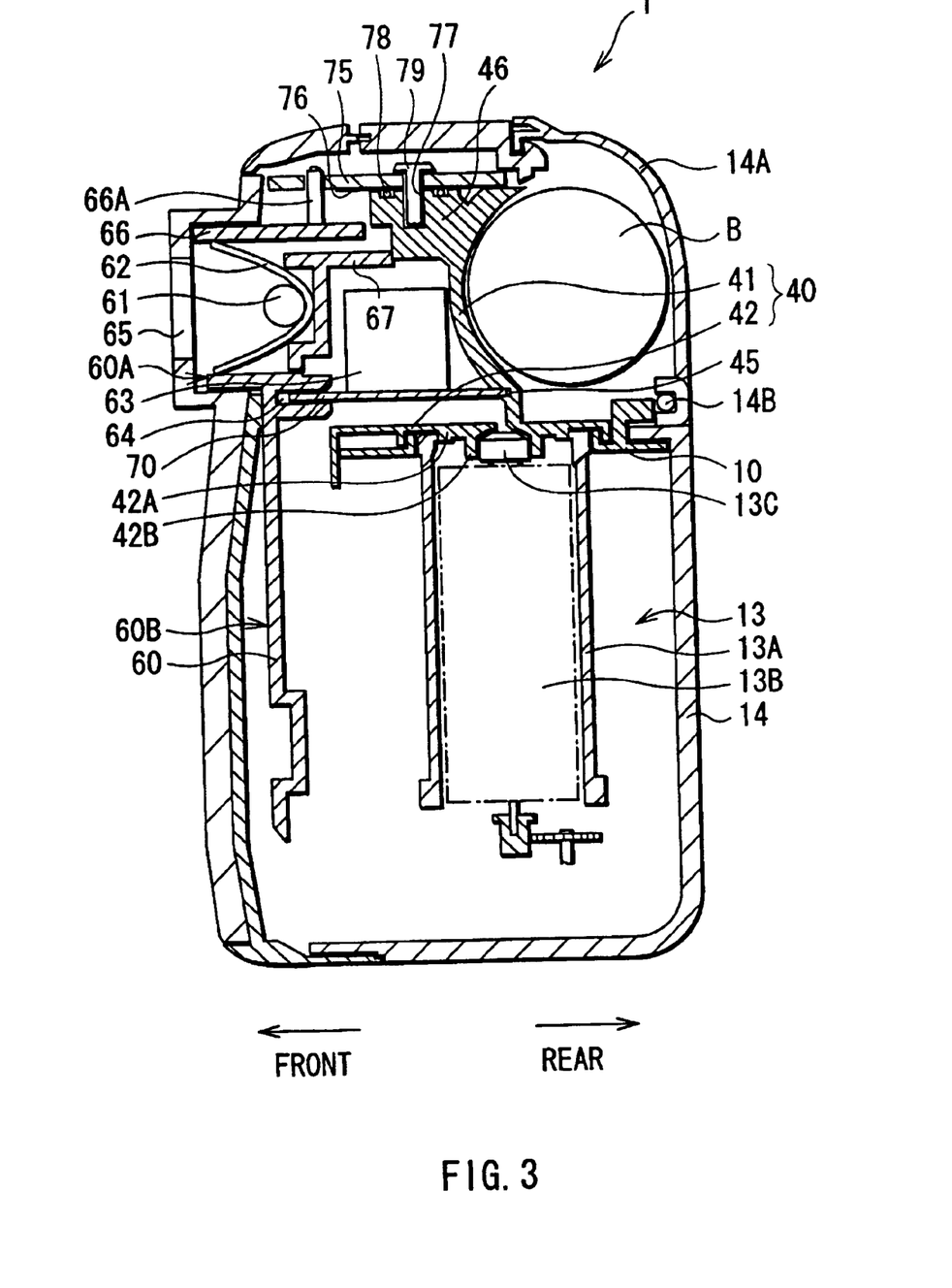
FIG. 3 is a sectional side view of the camera shown in FIG. 1.

FIG. 3 shows a cross-sectional view of the camera 1 shown in FIG. 1 taken along the line III—III. The semicylindrical portion 40 has an arc-shaped wall 41 having a substantially-semi-arc shape formed so as to be projected toward the front. The arc-shaped wall 41 is disposed in a substantially central portion in the direction of the width of the camera 1, and holds a battery B on the rear side thereof. In the casing 14, a battery lid 14A is formed on a region corresponding to the rear side of the semicylindrical portion 40. The battery lid 14A can pivot about a spindle 14B disposed in the bottom end portion thereof. The battery lid 14A pivots so as to be capable of replacing the battery B held in the semicylindrical portion 40.

A pressure plate 42 of a plate-shaped part extends from the bottom end of the arc-shaped wall 41 of the semicylindrical portion 40 toward the front. The take-up spool 13A of a rotatable cylindrical shape is disposed in the take-up chamber 13 of the camera body 10, and in the take-up spool 13A, a motor 13B is disposed. On the pressure plate 42 of the semicylindrical portion 40, an engagement portion 42A slidably engaged with the top end edge of the take-up spool 13A and an engagement portion 42B engaged with a spindle of the motor 13B are formed. The semicylindrical portion 40 rotatably holds the take-up spool 13A of the camera body 10 by the pressure plate 42.

On the top portion of the camera body 10, a flash tube 61 made of a discharge tube such as a Xe tube, and a reflector for reflecting light emitted from the flash tube 61 toward the front are disposed in front of the semicylindrical portion 40. The reflector 62 has a function as an electrode for discharging electricity between the reflector 62 and the flash tube 61. In front of the camera body 10, a flash supporting plate 60 for supporting the flash tube 61 and the reflector 62 are mounted. The flash holding plate 60 has a plate-shaped portion 60B with a longer length in one direction, and a box-shaped portion 60A mounted on one end of the length direction of the plate-shaped portion 60B. The flash holding plate 60 corresponds to a specific example of "a holding member" in the invention. Incidentally, the flash tube 61, the reflector 62 and the flash holding plate 60 are not shown in FIG. 2.

A flash drive portion (trigger coil) 63 for making the flash tube 61 emit light, and a flash control board (voltage step-up circuit) 70 for controlling a drive of the flash drive portion 63 are disposed between the flash holding plate 60 and the semicylindrical portion 40. The flash control board 70 is held in a horizontal position (that is, in parallel with the pressure plate 42) by a slit 45 formed in an outer face (a face of the front side) of the arc-shaped wall 41 of the semicylindrical portion 40, and a slit 64 formed in the flash holding plate 60 in a state that the both ends of the flash control board 70 are engaged in the slits 45 and 64. Further, a flash window portion 65 is formed in the casing 14 in a position corresponding to the front of the flash tube 61. Thereby, when the flash control board 70 makes the flash drive portion 63 drive, the flash tube 61 emits light, and the light is emitted from the flash window portion 65 directly or after the light is reflected on the reflector 62. The flash tube 61 corresponds to a specific example of "a flash tube" in the invention, and the flash control board 70 corresponds to a specific example of "a circuit board" in the invention. Moreover, the slit 64 corresponds to a specific example of "an engagement portion" in the invention.

The flash holding plate 60 includes a first rib 66 and a second rib 67 disposed above the flash tube 61 and the flash drive portion 63. The first rib 66 and the second rib 67 are provided for protecting a circuit susceptible to noise (such as a circuit for controlling a camera) mounted on a circuit board 75 (which will be described later) disposed above the first and second ribs 66 and 67 from an effect of electric discharge. The first rib 66 and the second rib 67 correspond to specific examples of "a shielding member" in the invention.

Figure 4:
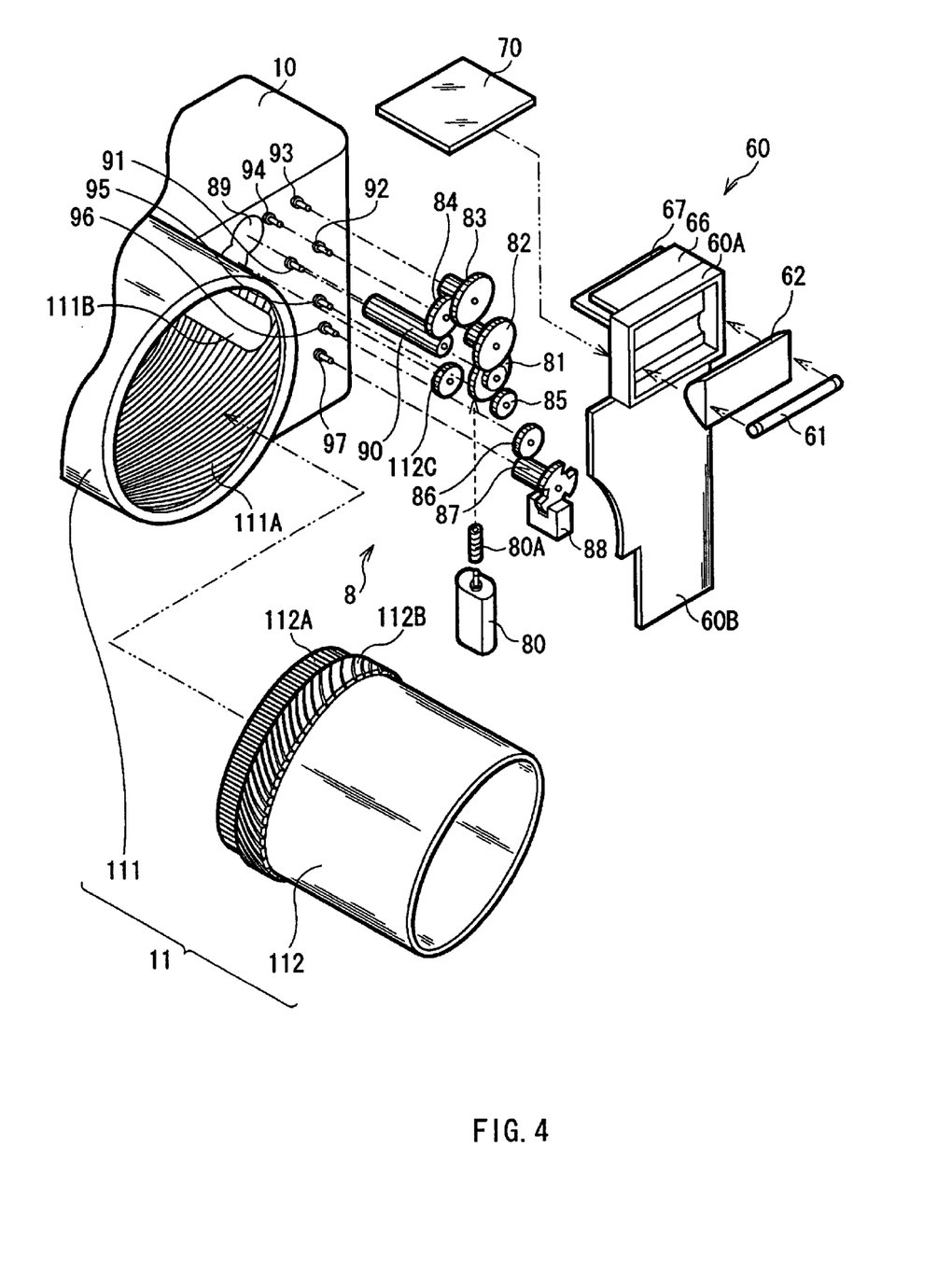
FIG. 4 is an illustration for explaining a function of a flash holding plate of the camera shown in FIG. 1.

FIG. 4 shows a perspective view for explaining a function of the flash holding plate 60. A gear system 8 for driving the movable barrel 112 in the zoom lens portion 11 is disposed on the front side of the camera body 10. The gear system 8 includes a motor 80, a worm gear 80A mounted on an output axis of the motor 80, a first gear 81 engaged with the worm gear 80A, a second gear 82 engaged with the first gear 81, a third gear 83 engaged with the second gear 82, and a fourth gear 84 engaged with the third gear 83. The first gear 81, the second gear 82, the third gear 83 and the fourth gear 84 are rotatably supported by pins 91, 92, 93, and 94 provided on the front face of the camera body 10 in a protruding condition, respectively. The gear system 8 further includes a long columnar gear 90 engaged with the fourth gear 84. The columnar gear 90 is inserted into a mounting hole 89 formed in the camera body 10, and is rotatably supported by a pin (not shown) in the interior of the mounting hole 89. The columnar gear 90 is engaged with a spur gear portion 112A of the movable barrel 112 in the zoom lens portion 11 via a gear 112C in the interior of the mounting hole 89. The zoom lens portion 11 includes a fixed barrel 111 fixed with the camera body 10 and the movable barrel 112 which can move in a back-and-forth direction with respect to the camera body 10. The movable barrel 112 includes not only the spur gear portion 112A but also helicoid portion 112B. The helicoid portion 112B is engaged with a helicoid groove portion 111A disposed in the inner wall of the fixed barrel 111. Thereby, when the motor 80 rotates, a power generated by the motor 80 is transferred to the movable barrel 112 via the worm gear 80A, the first gear 81, the second gear 82, the third gear 83, the fourth gear 84, the columnar gear 90 and the gear 112C. The movable barrel 112, to which the power generated by the motor 80 is transferred, moves toward the front or the rear by rolling to carry out zooming. In this case, the gear 112C moves in a back-and-forth direction with the movable barrel 112 along a notch portion 111B disposed in the interior of the fixed barrel 111. In addition, in the movable barrel 112, the spur gear portion and the helicoid portion may be formed on the same region.

Moreover, the gear system 8 includes a fifth gear 85 engaged with the first gear 81, a sixth gear 86 engaged with the fifth gear 85, and an encoder wheel 87 engaged with the sixth gear 86. The fifth gear 85, the sixth gear 86 and the encoder wheel 87 are rotatably supported by pins 95, 96 and 97 provided on the front face of the camera body 10 in a protruding condition, respectively. A detecting sensor 88 for detecting a rotating position of the encoder wheel 87 is disposed in a bottom portion of the camera body 10. A rotation of the motor 80 (corresponding to a position of the movable barrel 112) is detected by the fifth gear 85, the sixth gear 86, the encoder wheel 87 and the detecting sensor 88.

The first gear 81, the second gear 82, the third gear 83, the fourth gear 84, the fifth gear 85, the sixth gear 86 and the encoder wheel 87 of the gear system 8 are sandwiched and held between the front face of the camera body 10 and the plate-shaped portion 60B of the flash holding plate 60 in a cross direction so as not to fall out of the pins 91 to 97, respectively. That is, the flash holding plate 60 has a function for holding not only the flash tube 61, but also each gear of the gear system 8. The gear system 8 corresponds to a specific example of "a gear system" in the invention.

As shown in FIG. 3, a supporting plate 46 for supporting the circuit board 75 and a flexible circuit board 76 is integrally formed in the top end portion of the arc-shaped wall 41 of the semicylindrical portion 40. On the circuit board 75, a control circuit for controlling throughout the camera 1 is mounted. The flexible circuit board 76 is provided for electrically connecting between the circuit board 75 and each drive portion of the camera 1.

The supporting plate 46 extends from the vicinity of the top end of an outer face of the arc-shaped wall 41 of the semicylindrical portion 40 toward the front. A top face of the supporting plate 46 is a flat face having a screw hole 77, and a ring-shaped part 78 made of an elastic material is disposed around the screw hole 77. On the top face of the supporting plate 46, the flexible circuit board 76 is mounted, and the circuit board is stacked on the flexible circuit board 76. By screwing a screw 79 into the screw hole 77 to tighten, the flexible circuit board 76 is tightly sandwiched between the circuit board 75 and the supporting plate 46, and thereby the circuit board 75 and the flexible circuit board 76 are pressed against each other. Further, as a front end portion of the circuit board 75 reaches above the first rib 66 of the flash holding plate 60, a positioning hole formed in the circuit board 75 is engaged with a dowel pin 66A disposed on the first rib 66 in a protruding condition.

Next, procedural steps of assembling the camera 1 configured in this manner will be described referring to FIG. 2. When assembling the camera 1, each optical part is mounted in the holding member 2. That is, the lens for photo-sensing 15A and the photo-sensing device 15B are mounted in the first mounted part 31 of the block portion 30, and the projection lens 16A and the light-emitting device 16 are mounted in the second mounted part 32. The red-eye minimizing lamp 17 is mounted in the third mounted part 33. Further, the movable lenses 18A and 18B, the guide bar 18C, the view frame 18D, the prism 18E and the eyepiece lens 18F are mounted in the fourth mounted part 34, and the lens for photo-sensing 19A and the photo-sensing device 19B are mounted in the fifth mounted part 35. Thus, the holding member 2 in which the optical parts are mounted is secured to the camera body 10 with screws (not shown).

Then, the first gear 81, the second gear 82, the third gear 83, the fourth gear 84, the fifth gear 85, the sixth gear 86 and the encoder wheel 87 of the gear system 8 shown in FIG. 4 are mounted on the pins 91 to 97 on the front face of the camera body 10, respectively. Further, the detecting sensor 88 is mounted on a bottom portion of the camera body 10.

Next, before mounting the flash holding plate 60 on the camera body 10, the flash tube 61 and the reflector 62 are mounted in the flash holding plate 60. Further, after an end of the flash control board 70 is engaged in the slit 64, the flash tube 61 and the flash control board 70 are electrically connected with each other. After the flash drive portion 63 is mounted on the flash control board 70, the flash holding plate 60 in which the flash tube 61, the reflector 62, the flash control board 70 and the flash drive portion 63 have been mounted is mounted on the front face of the camera body 10. By mounting the flash holding plate 60 on the front face of the camera body 10, the first gear 81, the second gear 82, the third gear 83, the fourth gear 84, the fifth gear 85, the sixth gear 86 and the encoder wheel 87 of the gear system 8 are sandwiched between the front face of the camera body 10 and the plate-shaped portion 60B of the flash holding plate 60, and are held so as not to fall out of the pins 91 to 97. Moreover, the other end of flash control board 70 of which the end is held by the slit 64 of the flash holding plate 60 is engaged in the slit 45 of the semicylindrical portion 40.

In addition, as shown in FIG. 3, on the supporting plate 46 of the semicylindrical portion 40, the flexible circuit board 76 and the circuit board 75 are stacked, and secured to the supporting plate 46 with the screw 79. Thereby, the flexible circuit board 76 is tightly sandwiched between the supporting plate 46 and the circuit board 75, and the flexible circuit board 76 and the circuit board 75 are pressed against each other. After that, the casing 14 is mounted so as to cover the camera body 10 and the holding member 2, and then the camera 1 is completed.

As described above, according to the camera of the embodiment, as each of the gears 81 to 87 of the gear system 8 is held by the flash holding plate 60 holding the flash tube 61, each of the gear 81 to 87 can be held only by mounting the flash holding plate 60 on the camera body 10. Therefore, compared with the case where the flash tube 61 and each of the gears 81 to 87 of the gear system 8 are held by separate components, an assembly process of the camera 1 becomes simpler. Further, as the plate-shaped portion 60B holding each of the gears 81 to 87 of the gear system 8, and the box-shaped portion 60A accommodating the flash tube 61 are integrally formed, the number of components can be reduced.

Moreover, as the flash control board 70 is held by the slit 64 formed in the flash holding plate 60, the flash control board 70 and a flash light-emitting body 61 can be electrically connected with each other on the flash holding plate 60, before mounting the flash holding plate 60 on the camera body 10. Therefore, the flash tube 61, the reflector 62, the flash drive portion 63 and the flash control board 70 mounted in the flash holding plate 60 can be treated as one independent unit, thereby resulting in improved convenience in the assembly process of the camera 1.

Moreover, as the first rib 66 and the second rib 67 of the flash holding plate 60 cover the top portions of the flash tube 61 and the flash drive portion 63, circuits mounted on the circuit board 75, more specifically, circuits susceptible to noise such as a circuit for controlling the camera can be protected from an effect of electrical discharge.

Although the invention has been described by the embodiment, the invention is not limited to the foregoing embodiment but can be variously modified.

As described above, according to the camera of the invention, as the holding member collectively holds the flash tube as well as each gear of the gear system, the flash tube and each gear of the gear system can be held only by mounting the holding member on the camera body. Therefore, compared with the case where the flash tube and each gear of the gear system are held by separate components, the assembly process of the camera becomes simpler. Further, as the flash tube and each gear of the gear system are held by the same holding member, the number of components can be reduced.

According to the camera of one aspect of the invention, as the circuit board is held by the engagement portion formed in the holding member, after the circuit board and the flash tube has been connected with each other on the holding member, the holding member can be mounted on the camera body. Therefore, the flash tube and the circuit board mounted on the holding member can be treated as one independent unit, thereby resulting in improved convenience in the assembly process of the camera.

According to the camera of another aspect of the invention, as the shielding member of the holding member covers a top portion of the flash tube, circuits such as a circuit susceptible to noise can be protected from an effect of electrical discharge.

Obviously many modifications and variations of the present invention are possible in the light of the above teachings. It is therefore to be understood that within the scope of the appended claims the invention may be practiced otherwise than as specifically described.

What is claimed is:

1. A camera having a movable part, the camera comprising:

a camera body;

a gear system including a plurality of gears for driving the movable part;

a flash tube for irradiating a subject with light; and a single integral holding member mounted on the camera body, and accommodating the flash tube and holding the plurality of gears of the gear system.

2. A camera having a movable part, the camera comprising:

a camera body;

a gear system including a plurality of gears for driving the movable part;

a flash tube for irradiating the subject with light; and a holding member mounted on the camera body, and holding the flash tube and the plurality of gears of the gear system, wherein the camera body includes a front face with a plurality of pins provided in a protruding condition and supporting the plurality of gears to be rotatable, respectively, and the holding member is disposed so as to face the front face of the camera body, and holds the plurality of gears so as to prevent the plurality of gears from falling out of the plurality of pins.

3. A camera according to claim 1, further comprising a circuit board mounting a circuit thereon, wherein the holding member includes an engagement portion engaged with part of the circuit board to hold the circuit board.

4. A camera according to claim 2, further comprising a circuit board mounting a circuit thereon, wherein the holding member includes an engagement portion engaged with part of the circuit board to hold the circuit board.

5. A camera according to claim 3, wherein the circuit mounted on the circuit board is a circuit for driving the flash tube.

6. A camera according to claim 4, wherein the circuit mounted on the circuit board is a circuit for driving the flash tube.

7. A camera according to claim 1, further comprising a shielding member covering at least one side of the flash tube and arranged in the holding member.

8. A camera according to claim 1, wherein the holding member includes a box-shaped portion for accommodating the flash tube, and a plate-shaped portion for holding the gear system.

9. A camera according to claim 1, wherein the movable part is a movable barrel with build-in lenses.

10. A camera having a movable part, the camera comprising:

a camera body;

a gear system including a plurality of gears for driving the movable part;

a flash tube for irradiating a subject with light; and a holding member mounted on the camera body, and holding the flash tube and all of the plurality of gears of the gear system.

11. A camera according to claim 10, further comprising a circuit board mounting a circuit thereon, wherein the holding member includes an engagement portion engaged with part of the circuit board to hold the circuit board.

12. A camera according to claim 11, wherein the circuit mounted on the circuit board is a circuit for driving the flash tube.

13. A camera according to claim 10, wherein the holding member has a shielding member covering at least one side of the flash tube arranged therein.

14. A camera according to claim 10, wherein the holding member includes a box-shaped portion for accommodating the flash tube, and a plate-shaped portion for holding the gear system.

15. A camera according to claim 10, wherein the movable part is a movable barrel with build-in lenses.

* * * * *

UNITED STATES PATENT AND TRADEMARK OFFICE
CERTIFICATE OF CORRECTION

PATENT NO. : 6,697,572 B2
DATED : February 24, 2004
INVENTOR(S) : Manabe et al.

It is certified that error appears in the above-identified patent and that said Letters Patent is hereby corrected as shown below:

<u>Title page</u>,
Item [73], Assignee, change "Fujii Photo Optical Co., Ltd." to
-- Fuji Photo Optical Co., Ltd. --.

Signed and Sealed this

Eleventh Day of October, 2005

JON W. DUDAS
*Director of the United States Patent and Trademark Office*